United States Patent [19]

Troy

[11] 4,045,612

[45] Aug. 30, 1977

[54] SPLICE CASE HOUSING

[75] Inventor: Michael Troy, Menlo Park, Calif.

[73] Assignee: Raychem Corporation, Menlo Park, Calif.

[21] Appl. No.: 615,818

[22] Filed: Sept. 22, 1975

[51] Int. Cl.² .......................................... H02G 15/10
[52] U.S. Cl. ................................ 174/136; 24/115 R; 174/92; 403/353
[58] Field of Search ...................... 174/92, 84 S, 94 S, 174/101, 135, 136; 339/119 R, 138, 141, 147 C, 244 UC, 265 F, 266 F, 272 UC; 24/73 BP, 115 R, 136 R, 243 AC, 243 K, 259 R; 220/293, 345, DIG. 25; 138/110; 251/7, 8; 403/353, 399, 405; 248/62, 74 R, 74 A, 224, 316 C, 316 D

[56] References Cited

U.S. PATENT DOCUMENTS

| 1,383,777 | 7/1921 | Stephens | 174/136 UX |
| 2,532,068 | 11/1950 | Larsen | 339/272 UC |
| 3,838,387 | 9/1974 | Grillet | 339/244 UC |

FOREIGN PATENT DOCUMENTS 115,882   2/1946   Sweden ................................ 248/62

Primary Examiner—Laramie E. Askin
Attorney, Agent, or Firm—Lyon & Lyon

[57] ABSTRACT

A metal housing for a splice case including a channel member and a plate which extends between the parallel sidewalls of the channel member. The channel member and associated plate thus form a first cavity, open at either end, in which a resilient splice case may be positioned. A passageway is also defined on the other side of the plate and between the outer portions of the parallel sidewalls. Flanges associated with the plate extend out of the channel member such that when the housing is securely positioned on a large pipe or the like, channel side down, the plate will be forced deeper into the channel member to further compress a splice case located therein. The rigid housing acts to protect the splice case and hold it in position.

3 Claims, 5 Drawing Figures

U.S. Patent      Aug. 30, 1977      4,045,612
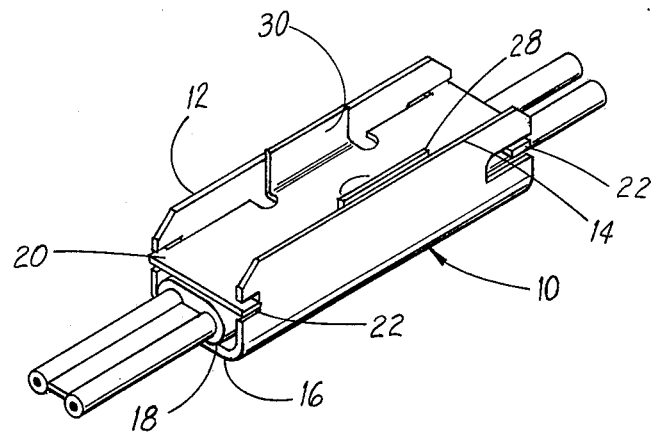
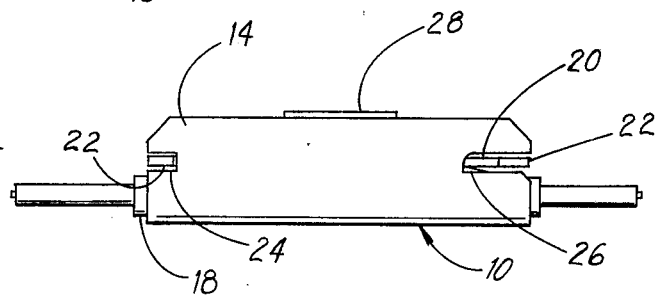
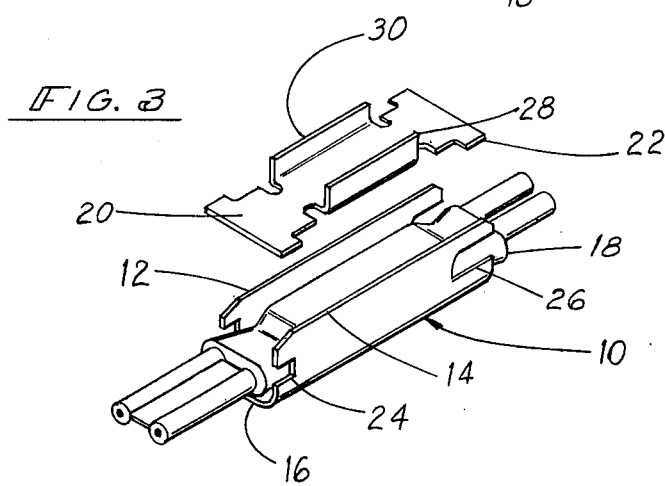
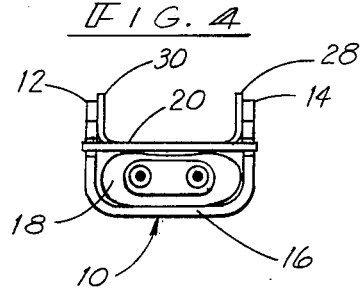
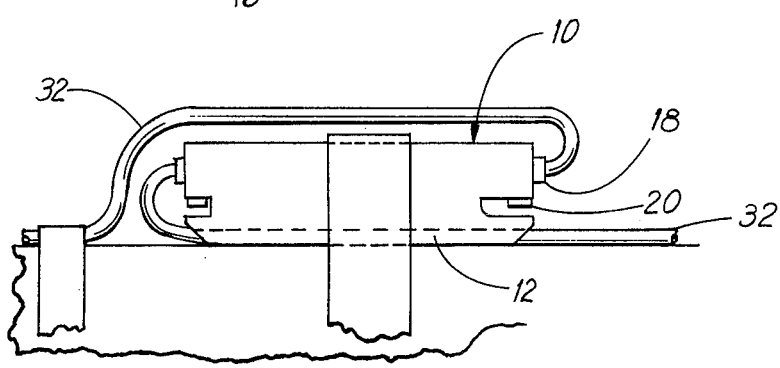

SPLICE CASE HOUSING

BACKGROUND OF THE INVENTION

The present invention is directed to a rigid housing for a waterproof splice case. More specifically, the present invention is directed to a housing for a splice case employed with exposed heater strip installations.

It has been found advantageous to maintain specific temperatures in pipelines and the like in order that the contents contained within the pipeline will remain flowable or otherwise be undamaged by low temperature. Techniques have been developed for maintaining specific temperatures in such pipelines. One such technique is to wind an electrical heater strip about the pipe in a helical manner. The extensive length of such heater strips requires periodic splicing as well as a splice at the lead end of the strip. Such splices generally occur along exposed area of pipe which are subject to the natural weather environment and may be subjected to damaging blows or other loads. As a result of this exposure, it has been found advantageous to provide a moisture proof enclosure which is also capable of resisting damage from extraneous blows and other injurious loads.

SUMMARY OF THE INVENTION

The present invention is designed to provide a hard splice case housing for use with flexible splice cases employed on exposed heater strip installations. The housing incorporates a rigid channel member having two parallel sidewalls between which a plate extends to define a cavity open at either end for the receipt and protection of flexible splice cases. The channel-shaped member provides excellent protection from blows and other injurious loads while the flexible and easily damaged splice case performs a moisture proofing function.

The plate extending between the two parallel sidewalls of the channel member also includes extended flanges which act to force the plate deeper into the channel member when the channel member is held tightly against the pipe or other substrate about which the heater strip is wound. Also with the channel member in position on a substrate, a passageway is provided between the plate and the substrate. The parallel sidewalls of the channel member extend beyond the plate position to define this additional passageway. Thus, a heater strip may pass through the channel member to provide continuous heat tracing along the path of the heater strip.

Accordingly, it is an object of the present invention to provide a protective housing for a splice case.

It is a further object of the present invention to provide a protective housing for heater strip splice case.

It is another object of the present invention to provide a splice housing for heater strip installations which allows continuous heat tracing.

Other and further objects and advantages will appear hereinafter.

BRIEF DESCRIPTION OF THE DRAWINGS

FIG. 1 is a perspective view of the present invention with a cable splice in position.

FIG. 2 is an elevational view of the present invention.

FIG. 3 is a perspective view of the present invention with the plate and channel member separated.

FIG. 4 is an end view of the present invention.

FIG. 5 is a side view of the present invention located on a substrate.

DETAILED DESCRIPTION OF THE DRAWINGS

Turning in detail to the drawings, a channel member 10 is illustrated as having two parallel sidewalls 12 and 14 extending from a common cross member 16. The channel member 10 is integrally formed and breaks about a gradual radius between the cross member 16 and each of the parallel sidewalls 12 and 14. As can be seen from FIG. 4, the channel member 10 provides a cavity between parallel sidewalls 12 and 14 which is substantially equal in width to the enclosed splice case 18.

Positioned within the channel member 10 is a plate 20 which extends across the width of the channel member 10 between the parallel sidewalls 12 and 14. The plate 20 includes tabs 22 which extend laterally from each corner of the plate 20. The tabs 22 engage notches 24 and 26 located through each of the parallel sidewalls 12 and 14. The shorter notches 24 are approximately equal in length to the tabs 22. The longer notches 26 are at least twice as long as the tabs 22. The added length of the notches 26 provides for the placement for the plate 20 in the channel member 10.

To assemble the plate 20 with the channel member 10, the plate 20 is first positioned so that the tabs 22 may enter the notches 26. To accomplish this, the plate 20 must extend at an angle away from the channel member 10 with the tabs 22 entering the notches 26. The plate 20 is then slid forward so that the tabs 22 will be positioned all the way into the notches 26. At this point, the tabs 22 associated with the notches 24 will clear the body of the channel member 10 and may be brought down into alignment with the notches 24. The plate 20 is then slid along the channel member 10 so that the tabs 22 will engage the notches 24. The tabs 22 associated with the notches 26 will remain in the notches 26 and the housing is assembled.

The plate 20 further includes two flanges 28 and 30 which extend from the plate 20 parallel to the sidewalls 12 and 14. These flanges 28 and 30 are centrally located on the plate 20 at either side thereof. Consequently, the flanges 28 and 30 extend immediately along the sidewalls 12 and 14. The flanges 28 and 30 are of a length which will allow them to extend outwardly of the parallel sidewalls 12 and 14 when the plate 20 is in position. Thus, when the channel member 10 is positioned on a substrate, such as seen in FIG. 5, pressure is exerted against the ends of the flanges 28 and 30. The notches 24 and 26 are wider than the tabs 22 in order that the plate 20 may experience limited movement to the plane of the plate 20. This movement is restricted to a relatively small amount, approximately 1/16 inch (0.159 cm.), which will allow a loading of the enclosed splice case 18 in compression. This pressure loading will act to further retain the splice case 18 in position.

Once the channel member 10 has been assembled with the plate 20 about a splice case 18, the completed housing may be positioned on a substrate in the normal disposition of the heater strip. FIG. 5 illustrates such a positioning of the housing. In order that continuous heat tracing can occur along the path of the heater strip, the heater strip 32 may be wound about splice and housing as can be seen in FIG. 5. The heater strip 32 emanating from the left end of the splice case 18 is allowed to pass beneath the plate 20 between the parallel sidewalls 12 and 14 in a natural channel formed therein. The other heater strip 32 is allowed to pass over the top of the housing and then is affixed to the substrate. In this way, a continuous heat tracing is accomplished while a rigid protective housing is provided for splice case and splice.

Thus, a highly efficient, easily fabricated and durable housing for a splice case is provided by the present invention. While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. A housing for a splice case comprising
a rigid channel member including parallel sidewalls, said sidewalls including notches therethrough at either end of each said sidewall;
a plate extending across said channel member between said parallel sidewalls and including tabs on either side thereof engaging said notches in said parallel sidewalls, said tabs and said notches allowing limited movement perpendicular to the plane of said plate; and
flanges extending from said plate parallel to said parallel sidewalls, said flanges extending outwardly from said channel beyond said parallel sidewalls.

2. The housing of claim 1 wherein said plate extends at an intermediate level in said channel to define a passageway between said parallel sidewalls exterior to said channel.

3. A housing for a slice case comprising
a rigid channel member including parallel sidewalls;
a plate extending across said channel between said parallel sidewalls at an intermediate level in said channel to define a passageway between said parallel sidewalls exterior to said channel and including tabs on either side thereof engaging said parallel sidewalls, said parallel sidewalls including notches receiving said tabs on said plate, said notches allowing said plate limited movement in either direction perpendicular to the surface of said plate; and
flanges extending from said plate parallel to said parallel sidewalls, said flanges extending outwardly from said channel beyond said parallel sidewalls.

* * * * *

UNITED STATES PATENT AND TRADEMARK OFFICE
CERTIFICATE OF CORRECTION

PATENT NO. : 4,045,612
DATED : August 30, 1977
INVENTOR(S) : MICHAEL TROY

It is certified that error appears in the above–identified patent and that said Letters Patent are hereby corrected as shown below:

Col. 4, line 10, delete "slice" and insert therefor --splice--.

Signed and Sealed this

Twenty-second Day of November 1977

[SEAL]

Attest:

RUTH C. MASON
*Attesting Officer*

LUTRELLE F. PARKER
*Acting Commissioner of Patents and Trademarks*